US010459285B2

United States Patent
Amano

(10) Patent No.: US 10,459,285 B2
(45) Date of Patent: Oct. 29, 2019

(54) POLARIZED RGB LIGHT SOURCE

(71) Applicant: Konica Minolta Laboratory U.S.A., Inc., San Mateo, CA (US)

(72) Inventor: Jun Amano, Hillsborough, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 331 days.

(21) Appl. No.: 15/417,460

(22) Filed: Jan. 27, 2017

(65) Prior Publication Data

US 2017/0219753 A1    Aug. 3, 2017

Related U.S. Application Data

(60) Provisional application No. 62/288,817, filed on Jan. 29, 2016.

(51) Int. Cl.
  *G02B 6/00*   (2006.01)
  *G02F 1/1335* (2006.01)
  (Continued)

(52) U.S. Cl.
  CPC ....... *G02F 1/133536* (2013.01); *G02B 1/005* (2013.01); *G02B 6/0056* (2013.01); *G02B 6/1225* (2013.01); *G02F 1/13362* (2013.01); *G02F 1/133621* (2013.01); *G02B 6/0051* (2013.01); *G02B 6/0053* (2013.01); *G02F 2001/133614* (2013.01); *G02F 2202/32* (2013.01); *G02F 2202/36* (2013.01)

(58) Field of Classification Search
  None
  See application file for complete search history.

(56) References Cited

U.S. PATENT DOCUMENTS 7,700,936 B2 * 4/2010 Murakowski ......... B82Y 10/00
                                                257/103
8,462,827 B2 * 6/2013 Matsuo .................. H01S 5/105
                                                372/45.01
(Continued)

OTHER PUBLICATIONS

"Polarized Quantum Dot Emission in Electrohydrodynamic Jet Printed Photonic Crystals," Gloria G. See, Lu Xu, Erick Sutanto, Andrew G. Alleyne, Ralph G. Nuzzo, and Brian T. Cunningham, Applied Physics Letters 107, 051101 (2015); doi: 10.1063/1.4927648 (5 pages).
(Continued)

*Primary Examiner* — Bradley Smith
(74) *Attorney, Agent, or Firm* — Osha Liang LLP

(57) ABSTRACT

A device for producing polarized light includes a plurality of photonic crystal grid structures on a substrate. The plurality of photonic crystal grid structures includes one or more structured regions for the transmission of polarized blue light, polarized green light, and polarized red light. A green quantum dot layer is substantially positioned on the one or more structured regions for the transmission of polarized green light and a red quantum dot layer is substantially positioned on the one or more structured regions for the transmission of polarized red light. A blue light emitting diode array is disposed on the polarized light device such that the emission from the blue light emitting diode array facilitates the emission of red and green light from the red and green quantum dot layers.

21 Claims, 6 Drawing Sheets

(51) Int. Cl.
  *F21V 8/00*   (2006.01)
  *G02B 1/00*   (2006.01)
  *G02B 6/122*  (2006.01)

(56) References Cited

U.S. PATENT DOCUMENTS

| | | |
|---|---|---|
| 8,969,831 B2 | 3/2015 | Shapira et al. |
| 2011/0180781 A1 | 7/2011 | Raring et al. |
| 2012/0018764 A1* | 1/2012 | Choi .................. H01L 33/20 |
| | | 257/99 |
| 2017/0045643 A1* | 2/2017 | Cunningham ........... G02B 1/04 |
| 2017/0307936 A1* | 10/2017 | Tseng ............... G02F 1/133509 |
| 2018/0202616 A1* | 7/2018 | Yoon ..................... F21V 9/40 |

OTHER PUBLICATIONS

"Distance Dependence of Fluorescence Enhancement from Photonic Crystal Surfaces," Nikhil Ganesh, Patrick C. Mathias, Wei Zhang, and Brian T. Cunninghama, Journal of Applied Physics 103, 083104 (2008) (6 pages).

"Enhanced Fluorescence Emission from Quantum Dots on a Photonic Crystal Surface," Nikhil Ganesh, Wei Zhang, Patrick C. Mathias, Edmond Chow, J. A. N. T. Soares, Viktor Malyarchuk, Adam D. Smith and Brian T. Cunning, Nature Nanotechnology, vol. 2, 515 (Aug. 2007) (6 pages).

* cited by examiner

POLARIZED RGB LIGHT SOURCE

CROSS-REFERENCE TO RELATED APPLICATIONS

This application is a non-provisional patent application of and claims priority under 35 U.S.C. § 119(e) to U.S. Provisional Patent Application Ser. No. 62/288,817, filed on Jan. 29, 2016, and entitled: "Polarized RGB Light Source." The above Provisional Application is hereby incorporated in its entirety.

FIELD OF INVENTION

The present invention relates to the structure and fabrication method of a polarized Red, Green and Blue (RGB) light source produced by quantum dots (QDs) coupled with photonic crystal grid structures that may be used as a liquid crystal display (LCD) backlight.

BACKGROUND OF INVENTION

Quantum dot (QD) backlight stacks for a liquid crystal display (LCD) typically include a QD incorporated diffuser film, a polarizer film, and several brightness enhancing films. Such QD backlight stacks may produce a vivid color; however, the diffuser, polarizer, and brightness enhancing films increase the overall cost of the backlight stack, may make the backlight thick and ridged, increase the manufacturing complexity, and reduce light efficiency.

SUMMARY OF INVENTION

In one aspect, embodiments of the invention relate to a device for producing polarized light that includes a plurality of photonic crystal grid structures on a substrate. The plurality of photonic crystal grid structures includes one or more structured regions for the transmission of polarized blue light, one or more structured regions for the transmission of polarized green light, and one or more structured regions for the transmission of polarized red light. The device also includes a green quantum dot layer substantially positioned on the one or more structured regions for the transmission of polarized green light and a red quantum dot layer substantially positioned on the one or more structured regions for the transmission of polarized red light. A high refractive index film is disposed over the plurality of photonic crystal grid structures on the substrate and the green and red quantum dot layers. A blue light emitting diode array is disposed on the polarized light device such that the emission from the blue light emitting diode array facilitates the emission of red and green light from the red and green quantum dot layers.

In another aspect, embodiments of the invention relate to a method of fabricating a polarized light source that includes fabricating a plurality of photonic crystal grid structures on a substrate. The plurality of photonic crystal grid structures comprising one or more structured regions for the transmission of polarized blue light, one or more structured regions for the transmission of polarized green light, and one or more structured regions for the transmission of polarized red light. The method also includes depositing a green quantum dot layer substantially positioned on the one or more structured regions for the transmission of polarized green light and depositing a red quantum dot layer substantially positioned on the one or more structured regions for the transmission of polarized red light. The polarized light source is then coated with a high refractive index film. A blue light emitting diode array is disposed on the polarized light source such that the emission from the blue light emitting diode array facilitates the emission of red and green light from the red and green quantum dot layers.

Other aspects and advantages of the invention will be apparent from the following description and the appended claims.

BRIEF DESCRIPTION OF DRAWINGS

One or more embodiments of the invention will be described with reference to the accompanying drawings. However, the accompanying drawings illustrate only certain aspects or implementations of one or more embodiments of the invention by way of example and are not meant to limit the scope of the claims.

DETAILED DESCRIPTION

Figure 1:
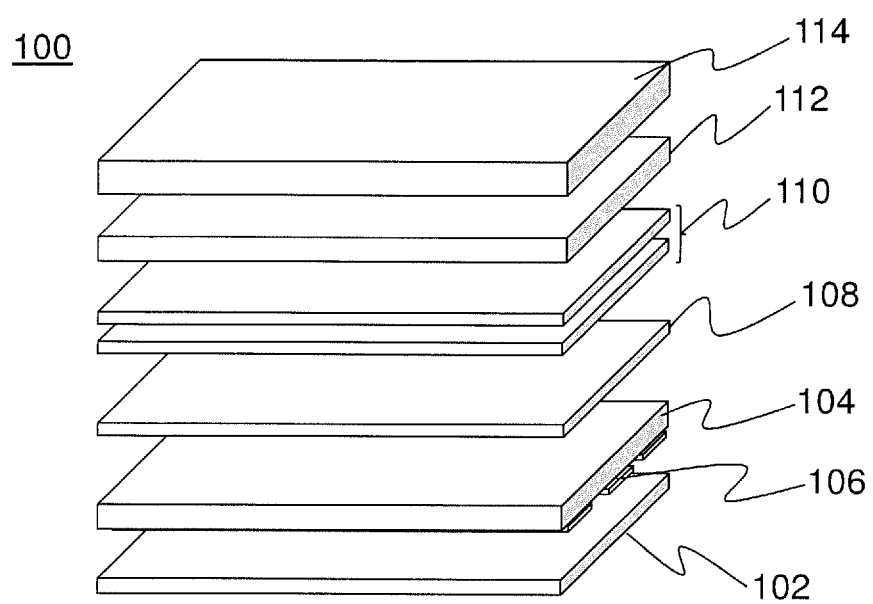
FIG. 1 demonstrates a quantum dot (QD) backlight stack for a liquid crystal display (LCD) in accordance with one or more embodiments of the invention.

Specific embodiments of the invention will now be described in detail with reference to the accompanying figures. Like elements in the various figures are denoted by like reference numerals for consistency. Further, the use of "FIG." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the claimed invention relate to a device and fabrication method for a polarized Red, Green and Blue (RGB) light source produced by quantum dots (QDs) coupled with photonic crystal grid structures. Embodiments of the invention may be used as a liquid crystal display (LCD) backlight. More specifically, embodiments of the invention produce high efficiency RGB polarized lights by combining green and red QDs and blue, green, and red photonic crystal grid structures.

One or more embodiments of the invention eliminate the need for polarizer films and/or several other optical enhancement films that may be used in conventional backlight stacks. As such, embodiments of the invention may significantly reduce the cost of backlight stacks and enable lower power operation. Further, one or more embodiments of the invention may result in a thinner backlight stack, as compared to conventional backlight stacks.

FIG. 1 demonstrates the elements of a QD backlight stack (100) in accordance with one or more embodiments of the invention. A QD backlight stack (100), from back to front, includes a reflector (102) with blue light emitting diodes (LEDs) (106) coupled to a light guide plate (104). A QD diffuser film (108) containing QDs is disposed on the light guide plate (104) such that the QDs in the QD diffuser film (108) are excited by the blue LEDs. One or more brightness enhancing films (BEFs) (110) are disposed on the QD diffuser film (108). Further, a reflective polarizer (112) is provided to polarize the light. A liquid crystal panel (114) is disposed on the reflective polarizer (112). The QD display backlight stack (100) may produce a vivid color; however, the BEFs (110) and reflective polarizer (112) film increase the overall cost of the backlight stack, make the backlight thicker and more ridged, increase manufacturing complexity, and reduce light extraction efficiency. One or more embodiments of the invention eliminate the need for the BEFs (110) and reflective polarizer (112).

Figure 2:
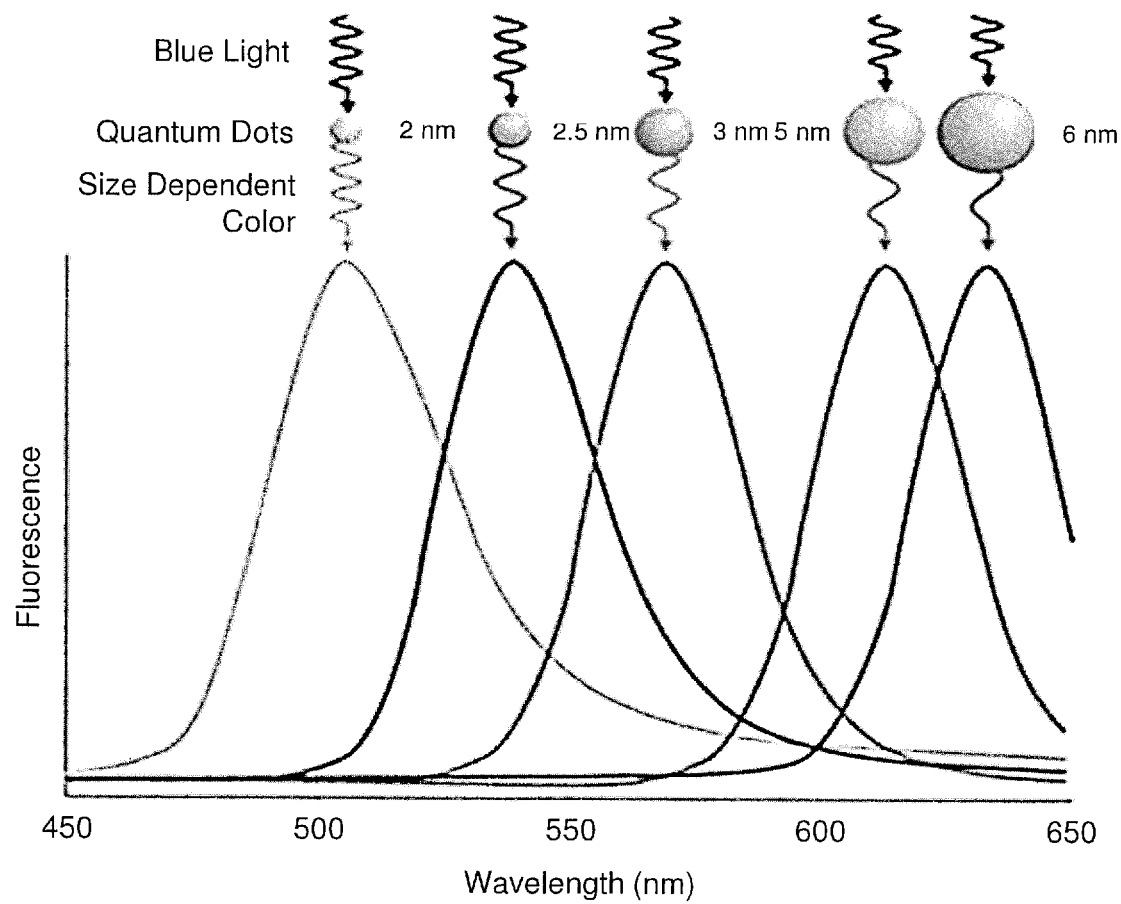
FIG. 2 demonstrates QD resonances in accordance with one or more embodiments of the invention.

FIG. 2 demonstrates one or more resonances of QDs in accordance with one or more embodiments of the invention. FIG. 2 demonstrates how the size and composition of QDs may be engineered to absorb blue light and emit light in other (higher wavelength) regions of the visible spectrum. FIG. 2 demonstrates that one particular QD may be selected to absorb blue light and emit red light, and another QD may be selected to absorb blue light and emit green light. One of ordinary skill in the art will appreciate that embodiments of the invention are not limited to a mixture of only two types of QDs. Mixtures of two or more QDs may be used to provide the desired emitted light in accordance with one or more embodiments of the invention. Further, one of ordinary skill in the art will recognize that that the concentrations of the different QDs, as well as the embedded environment of the QDs, may be manipulated to provide the desired emission of combined RGB light.

Figure 3:
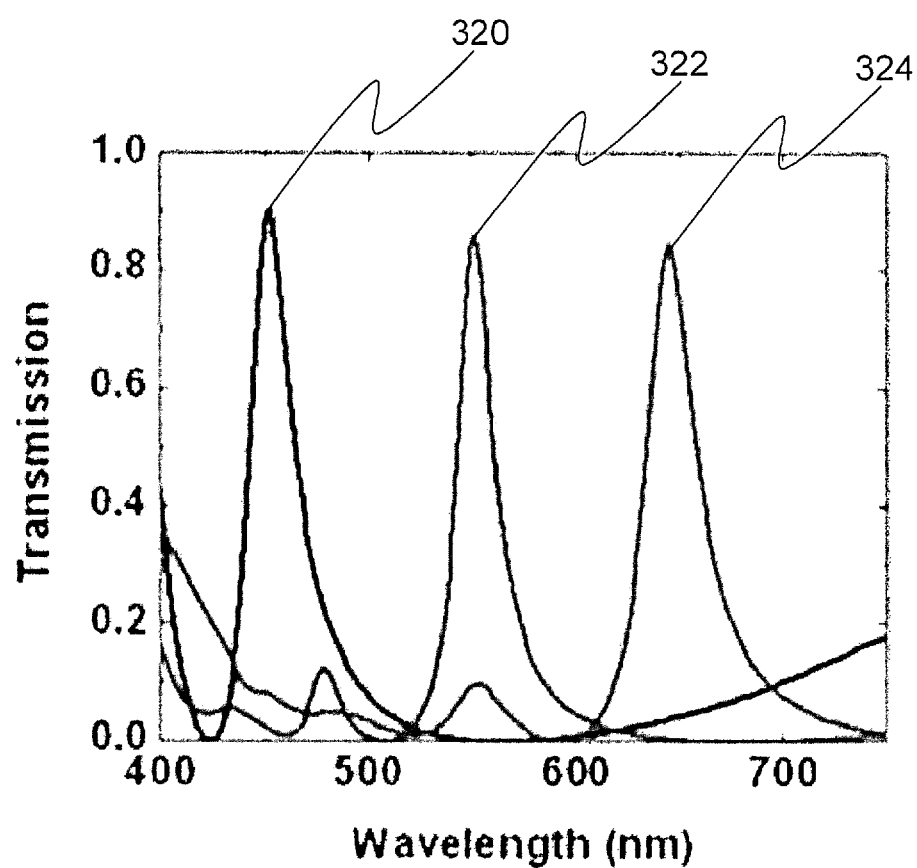
FIG. 3 demonstrates photonic crystal resonances in accordance with one or more embodiments of the invention.

FIG. 3 demonstrates simulated photonic crystal resonances in accordance with one or more embodiments of the invention. FIG. 3 demonstrates a simulated transmission of a 30 nm thick silver grating structure with different periods. In such a configuration, by increasing the period of the grating the transmission wavelength may be increased. FIG. 3 demonstrates blue (320), green (322), and red (324) photonic crystal transmission resonances in accordance with one or more embodiments of the invention. In addition, the light transmitted from such a device may be polarized based on the specifics of the photonic crystal.

Figure 4A:
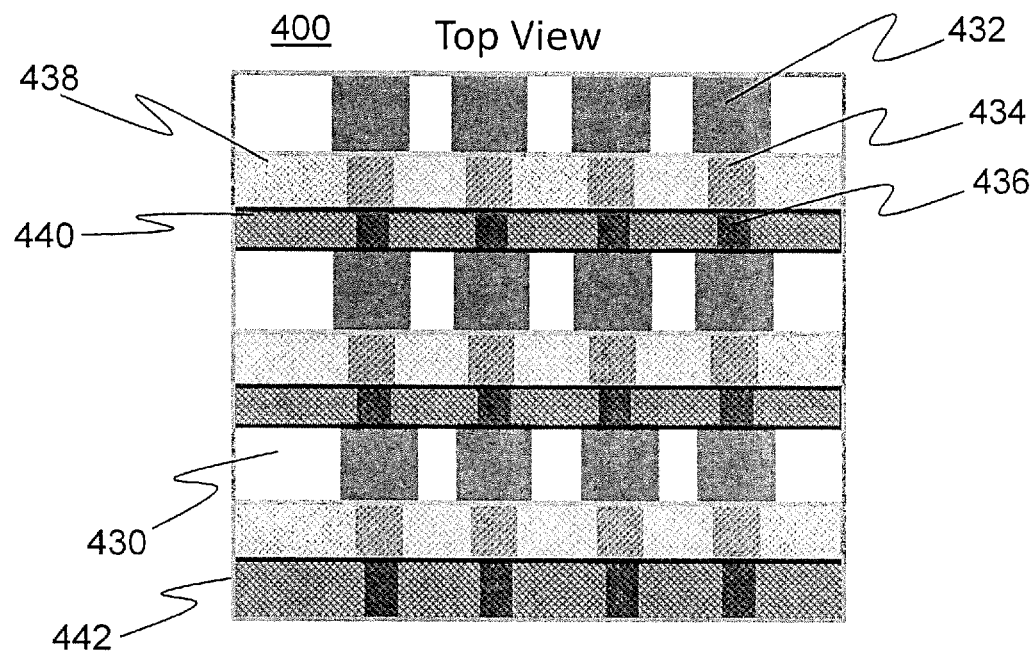
FIGS. 4A and 4B are schematics of a device in accordance with one or more embodiments of the invention.
Figure 4B:
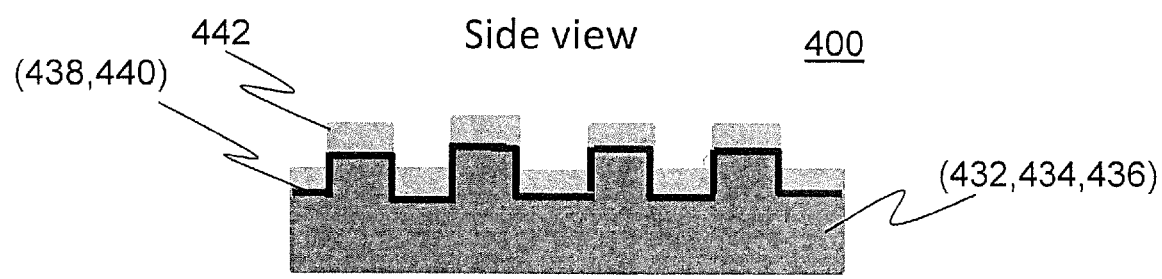

FIGS. 4A and 4B demonstrate a QD photonic crystal device in accordance with one or more embodiments of the invention. In accordance with one or more embodiments of the invention, FIG. 4A demonstrates a top view of the device (400), while FIG. 4B demonstrates a side view of a device (400). In FIG. 4A, a plurality of photonic crystal grid structures (432, 434, 436) are disposed or molded into a polymer substrate (430). For example, as shown in FIG. 4A, the photonic crystal includes a structured area for the transmission of blue light (432), a structured area for green light (434), and a structured area for red light (436). Then, as shown in FIG. 4A, the pattern of blue, green, and red structured areas (432, 434, 436) may be repeated on the polymer substrate (430).

Specifically, in accordance with one or more embodiments of the invention, the transmission of the blue light may be in the range of 440-450 nm, the transmission of the green light may be in the range of 520-530 nm, and the transmission of the red light may be in the range of 630-640 nm. The blue excitation wavelength and the wavelength emission of the specific QDs may be selected to coincide with the wavelength ranges of the photonic crystal structured areas in accordance with one or more embodiments of the invention.

The QD photonic crystal device (400) includes green QD layer (438) disposed predominately on the structured area for green light (434) in accordance with embodiments of the invention. Similarly, the QD photonic crystal device (400) includes red QD layer (440) disposed predominately on the structured area for red light (436). No QD layer is needed for the blue light, as the blue light is provided by light emitting diodes and also used as an excitation source for the red (440) and green (438) QD layers. The green QD layer (438) and red QD layer (440) may be deposited using inkjet printing methods, or other methods as known in the art. For example, the QD layers may be deposited in a solution-based process.

FIG. 4B is a side view of a device (400) in accordance with one or more embodiments of the invention. FIG. 4B demonstrates a high refractive index layer (442), for example a titanium dioxide layer, zirconium dioxide layer, and combination of those oxide layers, that is disposed over the top of the QD layers (438, 440) and the photonic crystal grid structures (432, 434, 436) in accordance with one or more embodiments of the device (400).

Figure 5A:
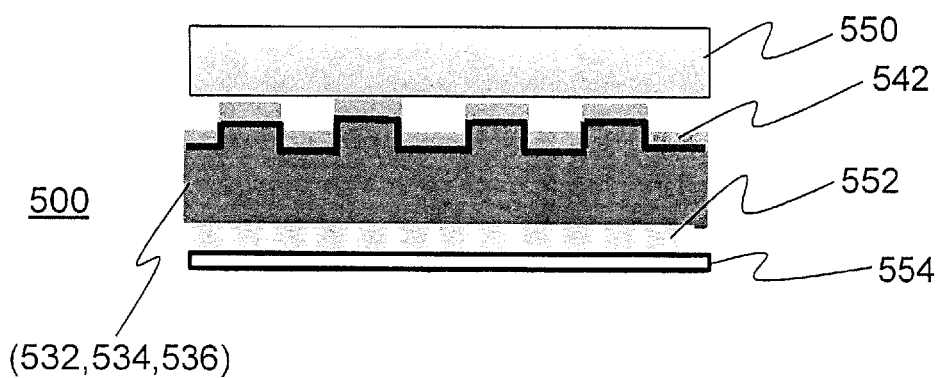
FIGS. 5A and 5B are schematics of a device in accordance with one or more embodiments of the invention.
Figure 5B:
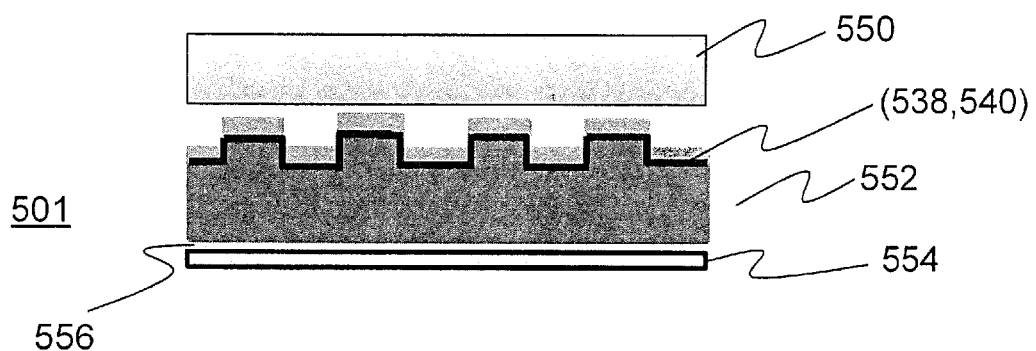

FIGS. 5A and 5B demonstrate liquid crystal display devices in accordance with one or more embodiments of the invention. The devices (500, 501) are shown in the side view and include the high refractive index layer (542), the QD layers (538, 540), and the photonic crystal grid structures (532, 534, 536) in accordance with embodiments of the invention. In FIGS. 5A and 5B, a liquid crystal display layer (550) is disposed over the high refractive index layer (542). In FIG. 5A, a blue LED layer (552) layer is provided on the other side of the device (500) to directly provide the blue excitation light through the photonic crystal grid structure and QD layers. The device (500) further includes a reflector film (554) disposed on the other side of the blue LED layer (552) to increase the throughput of the blue excitation light through the device (500). FIG. 5B demonstrates one or more embodiments that include a diffuse layer (556) disposed between the photonic crystal grid structure and the reflector film (554). In these embodiments, blue LEDs may be disposed on one side of the photonic crystal layers in the device (501). The diffuse light guide layer (556) may be engineered to provide total internal reflection of the blue light through the diffuse light guide layer (556) and, hence, propagate the blue light through the device (501).

Figure 6:
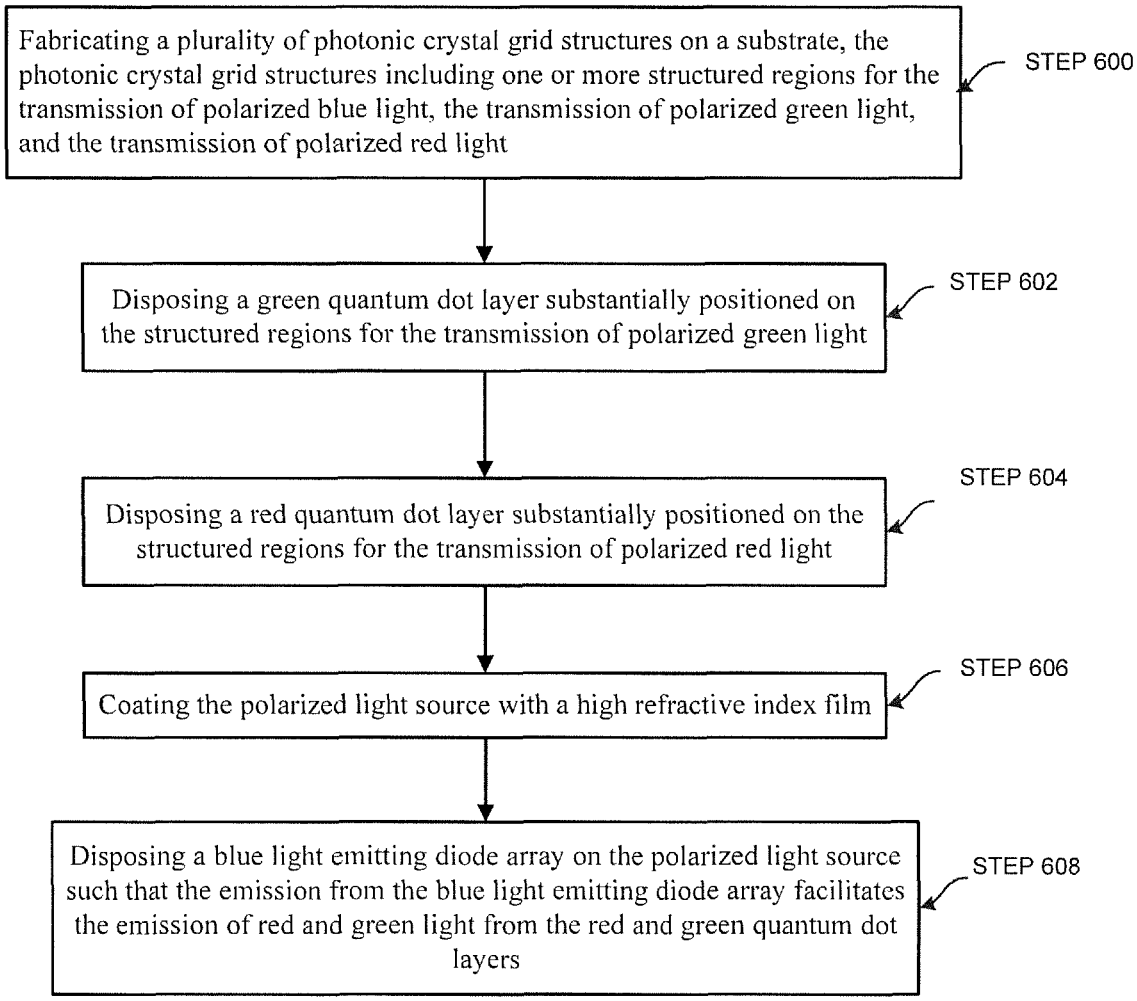
FIG. 6 is a flow chart in accordance with one or more embodiments of the invention.

FIG. 6 is a flow chart demonstrating a method of fabricating the QD photonic crystal grid structures in accordance with one or more embodiments of the invention. In STEP 600, a plurality of photonic crystal grid structures are deposited or formed on a substrate. The plurality of photonic crystal grid structures includes one or more structured regions for the transmission of polarized blue light, one or more structured regions for the transmission of polarized green light, and one or more structured regions for the transmission of polarized red light. The design of the structured regions of the RGB photonic crystal grid structures may be tailored to the color sensitivity of human vision in accordance with one or more embodiments of the invention.

In one or more embodiments, the structured regions may be a grating type structure where the pitch, width, and material of the grating type structures are selected based on the desired transmission of the red, green, and blue light. For example, a grid pitch (X-axis) on the order of a few 100 nm, height (Z-axis) on the order of a few 100 nm and minimum width (Y-axis) of the grid is about 20 microns. The minimum width may be selected in order for easy deposition of the QD layers.

The photonic crystal grid structures may be formed using lithography techniques, such as optical, imprint, and molding. The material of the substrate may be selected based on the lithography techniques used. For example, the substrate material may be glass, poly(ethylene terephthalate) (PET), poly(ethylene-2,6-naphthalene dicarboxylate) (PEN), or combinations thereof.

In STEP 602, a green QD layer substantially positioned on the one or more structured regions for the transmission of polarized green light is deposited. In STEP 604, the red QD layer substantially positioned on the one or more structured regions for the transmission of polarized red light is deposited. In STEPs 602 and 604, the QD layers may be deposited using inkjet printing techniques in accordance with one or more embodiments of the invention. The QD layers may also deposited using solution techniques. The concentration of the QDs in the QD layers may be on the order of approximately 10% QDs by volume. Further, the QD layers may be on the order of 100 nm thick. One of ordinary skill in the art will appreciate that this is a relatively low quantity usage of QDs, resulting in a lower cost of the manufacturing of the device.

As noted above, the associated (green or red) QD layer substantially overlaps the structured photonic crystal grid structures for the associated (green or red) polarized light transmission. However, it is noted that because the structured regions of the photonic crystal grid structures only allow the transmission of specific wavelengths, any misalignment between the photonic crystal grid structures and QD layers may not be detrimental to the operation of the device.

In STEP 606, a high refractive index film is deposited over the exposed structured regions for the transmission of polarized blue light, the green QD layers, and the red QD layers. In other words, after the deposition of the green and red QD layers, the device is coated with the high refractive index film. The high refractive index ($n \geq 1.7$) film may be TiO2 or ZrO2, or combination of those oxides. The thickness of the high refractive index film may be on the order of 100 nm.

In STEP 608, a blue light emitting diode (LED) array is disposed on the polarized light device such that the emission from the blue LED array facilitates the emission of red and green light from the red and green QD layers. The blue LED array may be disposed as described above in FIGS. 5A and 5B.

Embodiments of the invention may be fabricated using roll-to-roll processing to facilitate production. In one or more embodiments, the plurality of structured regions for the blue, green, and red polarized emission may be repeated to achieve the desired size. Such embodiments may be especially beneficial for use in relatively large LCD backlight stacks.

Embodiments of the invention provide high efficient RGB polarized lights by combining green and red QD layers with blue, green and red photonic crystal grid structures. Embodiments of the invention eliminate the need for polarizer films and brightness enhancement films, resulting in a thin RGB backlight with lower cost and high efficiency.

While the invention has been described with respect to a limited number of embodiments, those skilled in the art, having benefit of this disclosure, will appreciate that other embodiments can be devised without departing from the scope of the invention as disclosed herein. Accordingly, the scope of the invention should be limited only by the attached claims.

What is claimed is:

1. A device for producing polarized light, the device comprising:
    a plurality of photonic crystal grid structures on a substrate, the plurality of photonic crystal grid structures comprising one or more structured regions for the transmission of polarized blue light, one or more structured regions for the transmission of polarized green light, and one or more structured regions for the transmission of polarized red light;
    a green quantum dot layer substantially positioned on the one or more structured regions for the transmission of polarized green light;
    a red quantum dot layer substantially positioned on the one or more structured regions for the transmission of polarized red light;
    a high refractive index film disposed over the plurality of photonic crystal grid structures on the substrate and the green and red quantum dot layers; and
    a blue light emitting diode array disposed on the polarized light device such that the emission from the blue light emitting diode array facilitates the emission of red and green light from the red and green quantum dot layers.

2. The device of claim 1, further comprising a liquid crystal display (LCD) layer.

3. The device of claim 1, wherein the photonic crystal grid structures of the plurality of photonic crystal grid structures have a grid pitch of 100 to 400 nm, a grid height of 100 to 300 nm, and a grid width of at least 20 microns.

4. The device of claim 1, wherein the green and red quantum dot layers are disposed using inkjet printing techniques.

5. The device of claim 1, further comprising a reflector film, wherein the blue light emitting diode array is disposed in a layer between the reflector film and the opposite side of the substrate from the plurality of photonic crystal grid structures.

6. The device of claim 1, wherein the green and red quantum dot layers are approximately 100 nm thick.

7. The device of claim 1, wherein the substrate is one selected from the group consisting of: glass, poly(ethylene terephthalate) (PET), and poly(ethylene-2,6-naphthalene dicarboxylate) (PEN).

8. The device of claim 1, wherein the high refractive index layer has a refractive index higher than 1.7 and a layer thickness of approximately 100 nm.

9. The device of claim 1, wherein the green and red quantum dot layers comprise a concentration of 10% of green and red quantum dots by volume, respectively.

10. The device of claim 1, wherein the plurality of photonic crystal grid structures is fabricated using lithography techniques.

11. A method of fabricating a polarized light source, the method comprising:
    fabricating a plurality of photonic crystal grid structures on a substrate, the plurality of photonic crystal grid structures comprising one or more structured regions for the transmission of polarized blue light, one or more structured regions for the transmission of polarized green light, and one or more structured regions for the transmission of polarized red light;
    disposing a green quantum dot layer substantially positioned on the one or more structured regions for the transmission of polarized green light;

disposing a red quantum dot layer substantially positioned on the one or more structured regions for the transmission of polarized red light;

coating the polarized light source with a high refractive index film; and disposing a blue light emitting diode array on the polarized light source such that the emission from the blue light emitting diode array facilitates the emission of red and green light from the red and green quantum dot layers.

12. The method of claim 11, wherein the photonic crystal grid structures of the plurality of photonic crystal grid structures have a grid pitch of 100 to 400 nm, a grid height of 100 to 300 nm, and a grid width of at least 20 microns.

13. The method of claim 11, wherein the green and red quantum dot layers are disposed using inkjet printing techniques.

14. The method of claim 11, wherein the blue light emitting diode array is disposed in a layer on the opposite side of the substrate from the plurality of photonic crystal grid structures.

15. The method of claim 11, wherein the green and red quantum dot layers are approximately 100 nm thick.

16. The method of claim 11, wherein the high refractive index layer has a refractive index higher than 1.7 and a layer thickness of approximately 100 nm.

17. The method of claim 11, wherein the green and red quantum dot layers comprise a concentration of 10% of green and red quantum dots, respectively.

18. The method of claim 11, wherein the substrate is one selected from the group consisting of: glass, poly(ethylene terephthalate) (PET), and poly(ethylene-2,6-naphthalene dicarboxylate) (PEN).

19. The method of claim 11, wherein the green and red quantum dot layers comprise a concentration of 10% of green and red quantum dots by volume, respectively.

20. The method of claim 11, wherein the plurality of photonic crystal grid structures is fabricated using lithography techniques.

21. The method of claim 11, wherein the method of fabricating the polarized light source is a roll-to-roll process.

* * * * *